Figure 1:
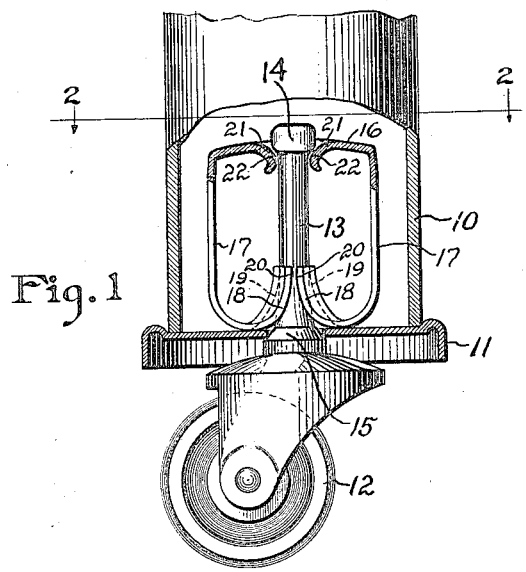

F. L. ROWNTREE.
TUBULAR LEG CASTER RETAINER.
APPLICATION FILED MAR. 5, 1921.

1,384,091.

Patented July 12, 1921.

INVENTOR
Frank L. Rowntree
BY
ATTORNEY

UNITED STATES PATENT OFFICE.

FRANK L. ROWNTREE, OF MERIDEN, CONNECTICUT, ASSIGNOR TO FOSTER, MERRIAM AND COMPANY, OF MERIDEN, CONNECTICUT, A CORPORATION OF CONNECTICUT.

TUBULAR-LEG CASTER-RETAINER.

1,384,091. Specification of Letters Patent. Patented July 12, 1921.

Application filed March 5, 1921. Serial No. 449,697.

*To all whom it may concern:*

Be it known that I, FRANK L. ROWNTREE, a citizen of the United States, residing at Meriden, county of New Haven, State of Connecticut, have invented an Improvement in Tubular-Leg Caster-Retainers, of which the following is a specification.

This invention has for its object to provide a retainer, which shall be made from strip metal, at a very low cost as no handwork is required, and which will securely but detachably retain casters of ordinary construction in tubular furniture legs, the retainer being self-retaining in the leg when inserted, and permitting free rotation of the caster but preventing it from dropping out when the article of furniture, in which it is used, is tilted or lifted from the floor, the pintle being locked to the retainer.

With these and other objects in view, I have devised the novel tubular leg caster retainer which I will not describe, referring to the accompanying drawing, forming a part of this specification, and using reference characters to indicate the several parts.

Figure 2:
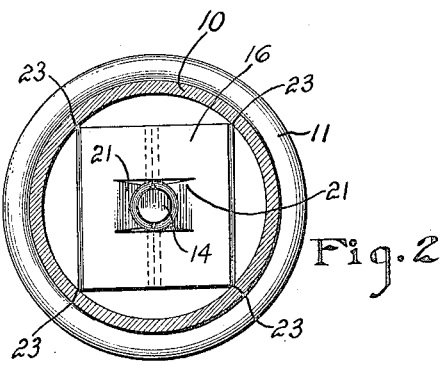
Figure 3:
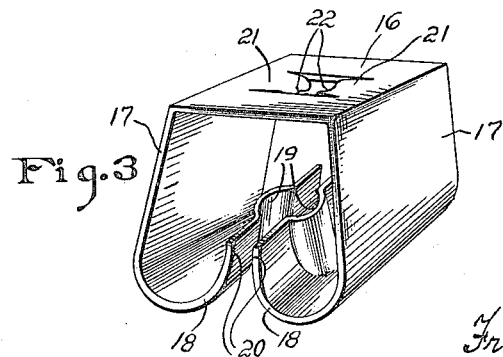

Figure 1 is an elevation of the lower end of a tubular furniture leg, broken away to show the retainer in place, and the upper end of the retainer being in section to show the manner in which the locking means grips the caster pintle;

Fig. 2, a sectional view on the line 2—2 in Fig. 1, looking in the direction of the arrows; and Fig. 3 is an enlarged perspective view of the retainer detached.

10 denotes a tubular furniture leg, 11 a leg mount on which the leg rests, and 12 a caster of ordinary construction, the pintle 13 of which is provided with a head 14 and at its lower end with a shoulder 15 on which the leg mount rests.

My novel retainer, see Fig. 3, is formed mechanically from resilient strip metal bent to U shape, and comprises a bridge or cross piece 16 formed from the mid-length of the blank, spring arms 17 extending obliquely from the cross piece, and upwardly turned pintle guide bearing members 18 at the ends of the arms. These guide bearing members are provided with coöperating, central grooves 19, which receive the pintle loosely and retain it in an approximately vertical position in use. The resiliency of the spring arms provides for the inevitable variation in the internal diameter of tubular legs. It is immaterial, in use, whether the faces of the bearing members, indicated by 20, are in actual contact or approximately so. If these faces are forced into actual contact, they limit the inward movement of the members and prevent pinching of the pintle.

At the center of the cross piece is an aperture, on opposite sides of which are locking lugs 21 struck inward from the metal and provided with concave inner faces, as at 22. In use, these locking lugs are forced inward toward the pintle, just under head 14. The curved faces of the lugs are not forced into actual contact with the pintle so that the latter is left perfectly free to rotate. The opening, however, between the lugs which receives the pintle is enough smaller than the diameter of the head so that the pintle is securely locked in the retainer and the caster cannot be removed from the furniture leg without removing the retainer.

The operation of my novel retainer is as follows: the pintle is passed upward between the guide bearing members and between the locking lugs of the retainer. In this position of the parts the caster may be readily detached from the retainer. The retainer, with the caster held therein, is then inserted in the leg and pushed upward to place until the end of the leg is seated on the leg mount, as clearly shown in Fig. 1. When the retainer is pushed into the leg the spring arms are forced inward toward each other and the guide bearing members are caused to inclose the pintle loosely, so as to retain it in place, and the locking lugs are forced into locking position below the head of the pintle, leaving the pintle perfectly free to rotate but locking the caster against removal until the retainer is withdrawn, carrying the caster with it. The instant the retainer is removed from the leg, the arms will spring outward from the position shown in Figs. 1 and 2, to that shown in Fig. 3, in which position the caster may be readily detached from the retainer. When the retainer is in operative position, as in Figs. 1 and 2, it will be noted that the spring arms are forced into an approximately vertical position, as in Fig. 1, and the edges of the arms, as at 23, are caused to bear against the wall of the tubular leg, thus providing four lines of contact extending practically the entire height of the retainer.

Having thus described my invention, I claim:

A tubular leg caster retainer made from resilient strip metal, and comprising a cross piece having pintle locking lugs struck inward therefrom, spring arms extending from the cross piece, and upwardly and inwardly turned pintle bearing members provided with centrally located grooves therein, at the ends of said spring arms.

In testimony whereof I affix my signature.

FRANK L. ROWNTREE.